United States Patent [19]

Laaksonen

[11] Patent Number: 5,464,314
[45] Date of Patent: Nov. 7, 1995

[54] DEVICE FOR HANDLING A VEHICLE WHEEL

[75] Inventor: Reijo Laaksonen, Kuhmo, Finland

[73] Assignee: Auto-Jure Oy, Kuhmo, Finland

[21] Appl. No.: 84,196

[22] PCT Filed: Jan. 23, 1992

[86] PCT No.: PCT/FI92/00016

§ 371 Date: Jul. 2, 1993

§ 102(e) Date: Jul. 2, 1993

[87] PCT Pub. No.: WO92/12864

PCT Pub. Date: Aug. 6, 1992

[30] Foreign Application Priority Data

Jan. 23, 1991 [FI] Finland ..................... 910347

[51] Int. Cl.⁶ ..................................... B60B 29/00
[52] U.S. Cl. ........................................ 414/427; 29/273
[58] Field of Search ..................... 414/426–429, 414/433; 29/273; 254/2 R, 2 B, 2 C

[56] References Cited

U.S. PATENT DOCUMENTS

| | | | |
|---|---|---|---|
| 2,379,587 | 7/1945 | Moore | 414/427 |
| 2,516,260 | 7/1950 | Schildmeier | 414/427 |
| 2,692,694 | 10/1954 | Goldstein | 414/428 |
| 2,846,099 | 8/1958 | Sjoquist | 414/427 |
| 3,273,857 | 9/1966 | Branick | 254/2 R |
| 3,501,037 | 3/1970 | Donovan | 414/427 |
| 3,653,527 | 4/1972 | Seymour | 414/427 |
| 4,022,341 | 5/1977 | Lindquist | 414/426 |
| 4,056,207 | 11/1977 | Spilker | 414/427 X |
| 4,930,966 | 6/1990 | Chien | 414/427 |
| 5,158,416 | 10/1992 | Pozo | 414/427 |
| 5,180,274 | 1/1993 | Haugen et al. | 414/427 |

FOREIGN PATENT DOCUMENTS 0052586 5/1982 European Pat. Off. .
1339249 11/1973 United Kingdom .

*Primary Examiner*—David A. Bucci
*Attorney, Agent, or Firm*—Ladas & Parry

[57] ABSTRACT

The invention relates to a device for handling a vehicle wheel, especially for removing a wheel of a lorry from a shaft (24) or for installing it in position, comprising a vertically movable frame portion (2), and gripping elements (11, 12, 13) connected to the frame portion for gripping the vehicle wheel (14) and lifting or otherwise displacing the wheel (14) from the shaft (24) or back onto the shaft (24), the gripping elements (11, 12, 13) comprising two or more support members (21, 22, 23) arranged to be fitted into a groove in the disc of the wheel (16) to be handled. The support members (21, 22, 23) are of such shape that the vehicle wheel is rotatable on the support members (21, 22, 23) fitted into the disc wheel groove (20).

15 Claims, 3 Drawing Sheets

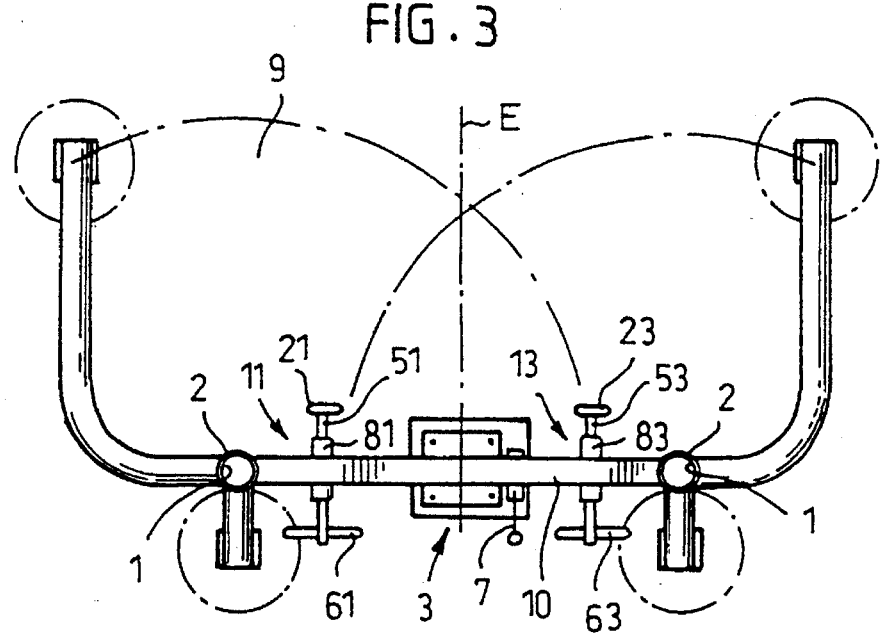
FIG. 3
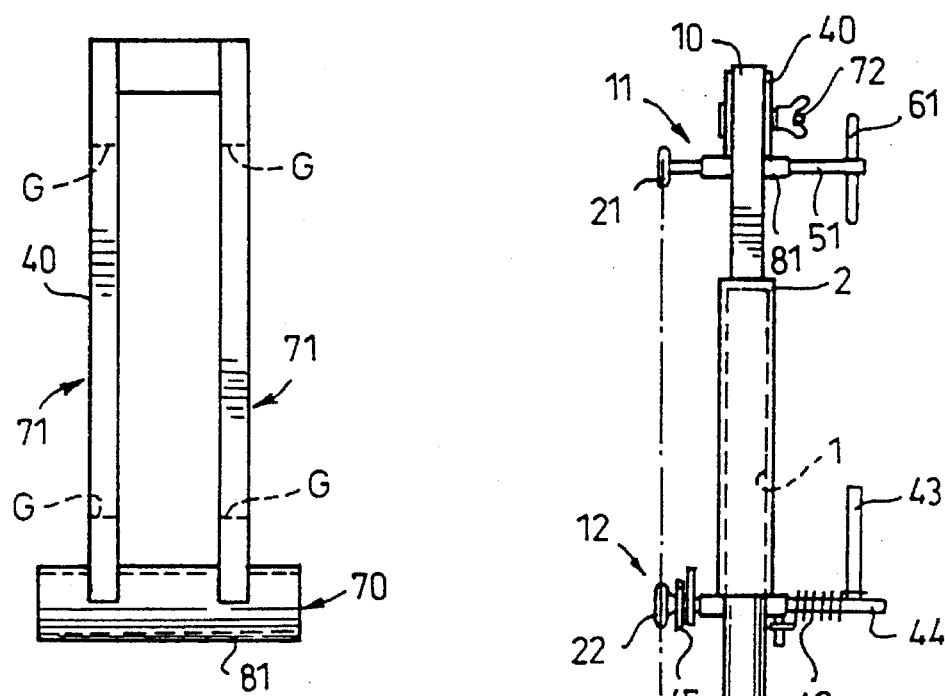
FIG. 8
FIG. 4
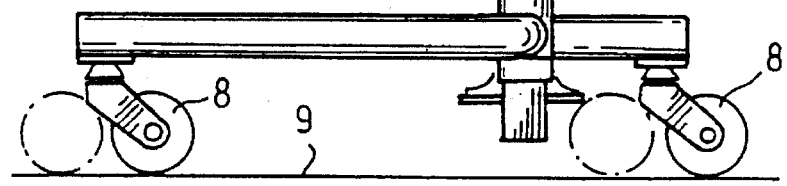

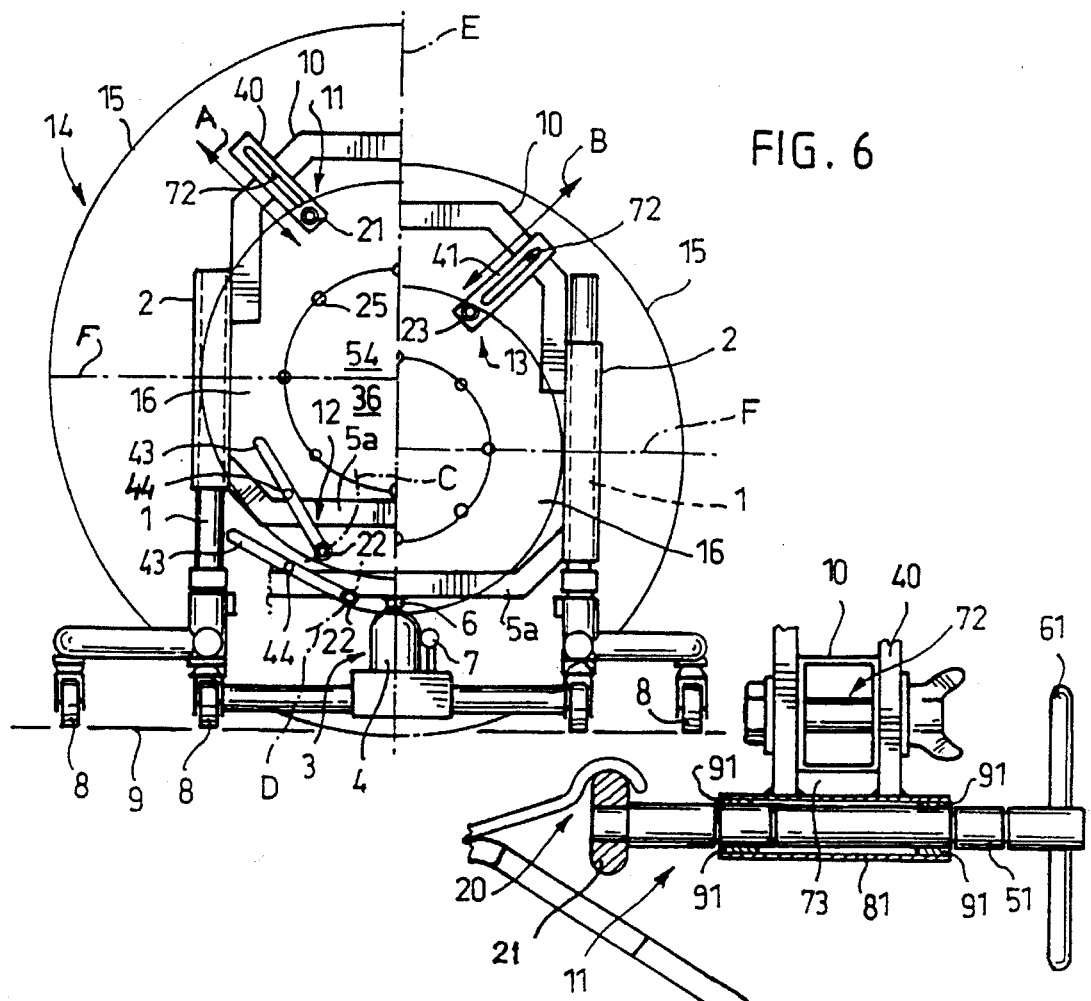
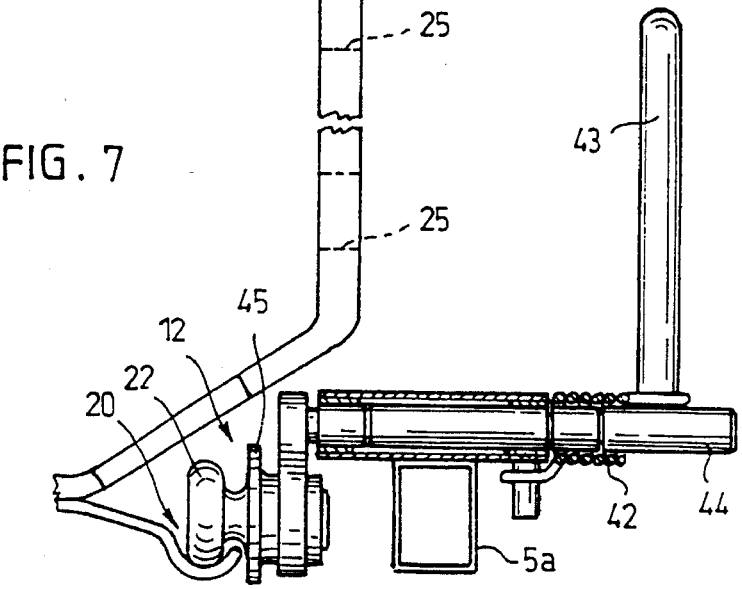
FIG. 6
FIG. 7

DEVICE FOR HANDLING A VEHICLE WHEEL

The invention relates to a device for handling a vehicle wheel, especially for removing a wheel of a lorry from a shaft or for installing it in position, comprising a vertically movable frame portion, and gripping means connected to said frame portion for gripping the vehicle wheel and lifting or otherwise displacing the wheel from the shaft or back onto the shaft, the gripping means comprising two or more support members arranged to be fitted into a disc wheel groove in the edge of a disc wheel to be handled.

BACKGROUND

The device of the invention is used when a vehicle wheel has to be removed from the shaft for repair or maintenance, for instance, or when the wheel has to be removed from the shaft to replace a worn tire with a new one, or when a spare wheel has to be installed on the road due to a tire failure.

The weight of the vehicle wheel itself is relatively high so that it may be dangerous to handle it merely by human power. Therefore auxiliary means are required for changing the wheel. Labor legislation requires that specified lifting weights should not be exceeded. In addition, the handling of the vehicle wheel requires accuracy, as the disc wheel is installed tightly on the shaft of the vehicle, and it is important that the vehicle wheel can be handled easily so that the placement of the wheel on the vehicle shaft can be shifted, that is, in practice, rotated accurately. The change of the vehicle wheel is especially difficult when the spare tire has to be installed in the vehicle in field conditions, because the driver nowadays has to face the problem alone and the conditions are difficult.

It is previously known to carry out the change of a worn or e.g. damaged wheel of a vehicle, such as a lorry for heavy equipment, by using auxiliary means. Solutions known from the prior art comprise long rolls to be positioned under or on both sides of the tire, and the vehicle wheel is then lifted by moving the rolls. Such a structure is disclosed e.g. in the publications DE - 3 047 844; U.S. Pat. No. 4,690,605; and EP - 0 125 551. EP - 0 114 147 discloses a structure comprising a means by which the wheel can be locked in position by pressing said means against the disc wheel.

The prior art has many disadvantages. When the tire of the vehicle wheel is damaged, e.g. blown out, the handling of the vehicle wheel is very difficult by means of the existing devices. A damaged vehicle tire, e.g. a tire broken completely apart, in which most of the tire portion of rubber has disappeared, cannot be gripped appropriately by the prior devices.

A further disadvantage of certain other known solutions is that the device is such in structure that it comprises various means positioned close to the end of the shaft positioned in the middle of the disc wheel, and so the inner wheel of twin wheels cannot, for instance, be removed by the prior art devices, because the parts of the device come into contact with the shaft end when one attempts to push the device towards the inner wheel of the twin wheels.

U.S. Pat. No. 4,022,341 discloses a device for lifting a vehicle wheel from a shaft. The wheel is handled with this device by the disc wheel groove, but the support means to be fitted into the disc wheel groove is of such shape that the wheel can only be lifted by means of it, as the support means comprises two adjacent narrow plate portions on which the wheel cannot be rotated. In addition, lifting in this device is carried out from the upper edge of the device by means of a lifting hook and a wire rope.

SUMMARY OF THE INVENTION

The object of the present invention is to provide a device for handling a vehicle wheel, which avoids the problems and disadvantages of the prior art solutions and enables the vehicle wheel to be removed and/or installed and handled in other ways efficiently, easily and reasonably. The solution of the invention enables the vehicle wheel to be rotated on support members fitted into the disc wheel groove, and so it is also possible to align the bolt holes of the wheel.

This object is achieved by means of a device according to the invention, which is characterized in that the support members are of such shape that the vehicle wheel is rotatable on the support members fitted into the disc wheel groove. In the preferred embodiment of the invention, the support member is roll-shaped or at least partially ball-shaped.

Various measures involving handling of a vehicle wheel can be carried out easily by means of the device of the invention. The structure of the device enables the wheel to be rotated and, accordingly, the bolt holes of a disc wheel, for instance, to be aligned. In addition, the inner wheel of twin wheels can be handled easily by the device according to the invention.

BRIEF DESCRIPTION OF THE DRAWINGS

In the following the invention will be described with reference to the attached drawings, in which

FIG. 3 is a top view of the device of the invention;

FIG. 4 is a side view of the device shown in FIG. 3;

FIG. 6 shows the device of the invention in the direction of FIG. 1;

FIG. 7 shows a fastening mechanism for the support members;

FIG. 8 shows a slide means used as a height adjusting means of the support member.

DETAILED DESCRIPTION

Figure 1:
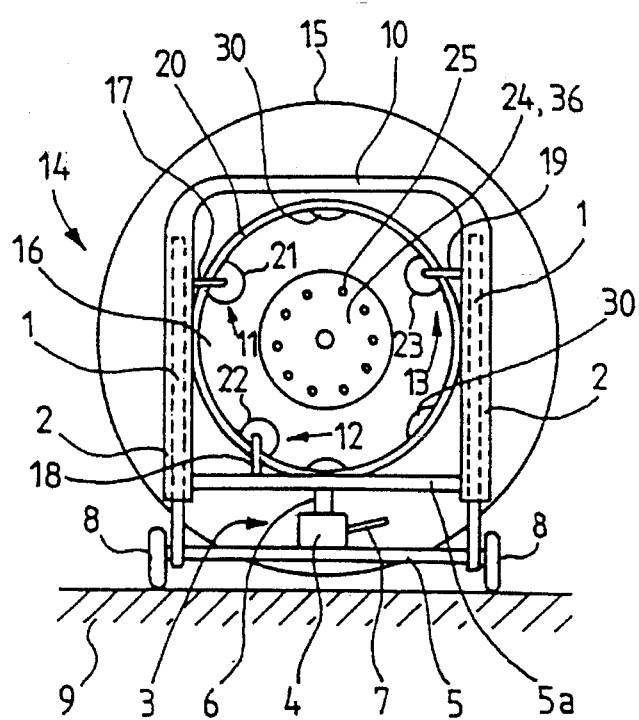
FIG. 1 shows the device of the invention as seen in the direction of the shaft of a vehicle.
Figure 2:
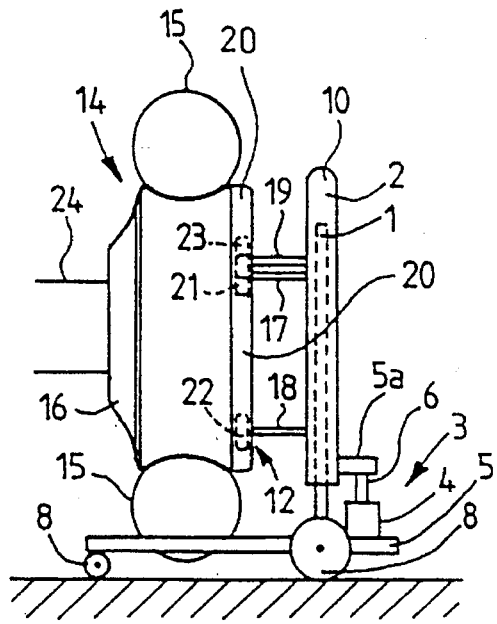
FIG. 2 shows the device of the invention as seen in a direction perpendicular to the shaft of the vehicle.

As shown in FIGS. 1 and 2, the device of the invention comprises a frame, that is, frame portions 1 and 2 which are movable with respect to each other either by means of an external lifting means or a lifting means 3 comprised in the device. The figures show the lifting means 3, such as a hydraulic lifter, having a fixed portion 4 supported on a transverse rod 5 connected to the inner frame portion 1, that is, to the stationary frame portion 1 of the device, and a movable portion 6 connected to a rod 5a interconnecting the different halves of the outer frame portion 2 of the device, the outer frame portion being movable upward with respect to the stationary inner frame portion 1 by said rod 5a under the influence of a force exerted on the lifting means 3 by a crank 7. The lifting means 3 may also be supported on an underlying surface.

The stationary inner frame portion 1 of the device is connected to support wheels 8, of which there are several and by means of which the device is easy to displace on the underlying surface 9. The inner and outer frame portion 1 and 2 of the device are positioned at least partly within each other on two sides so that the device comprises a structure formed by connecting the inner frame portions 1, formed as pipes with the transverse rod 5 and a structure which comprises the outer frame portions 2, formed as pipes and an interconnecting upper transverse pipe 10 and the rod 5a, to which a lifting force can be exerted by the lifting means 3. Both halves of the outer frame portions 2 and the upper transverse pipe 10 are preferably made of the same pipe by bending.

The device comprises at least two (in the figures three) gripping means 11, 12, 13, by means of which a vehicle wheel 14 can be lifted or otherwise displaced or supported when a tire 15 with its disc wheel 16 is removed or installed. The gripping means 11, 12, 13 respectively comprise an arm 17, 18, 19 or other similar means, which is connected to the frame portion 2 liftable by the lifting means 3, a preferably substantially roll-like support member 21, 22, 23 connected to the arm 17, 18, 19, respectively, which support members are arranged to be fitted into a disc wheel groove 20 at the lifting stage, and they form part of the gripping means 11, 12, 13 as well as the support arms. The term "gripping means" refers to the construction comprising the support member, such as a roll-like or ball-like support member, and its fastening structure, such as an arm.

As shown in FIGS. 1 and 2, there may be e.g. three gripping means 11, 12, 13 with the support members 21, 22, 23, which can be fitted into the disc wheel groove 20 in the outer edge of the disc wheel 16 at the lifting stage. The support members 21, 22, 23 are preferably at least partially circular, that is, preferably roll-like i.e. disc-like, or ball-like, and each support member is connected by a fastening mechanism, such as the arm 17, 18, 19, to the outer frame pipe 2 of the frame, that is, to the vertically movable portion of the frame structure of the device, so that when the outer frame portion 2 is lifted by the lifting means 3, the gripping means 11, 12, 13 with their support members 21, 22, 23 rise with the outer frame portion 2, which can be moved from below in the vertical direction, and thereby the support members are fitted into the disc wheel groove 20. When the lifting movement is continued, the wheel 14 remains resting on the support members 21–23 so that the wheel no longer rests the shaft 24 of the vehicle.

The support member arms 17, 18, 19 comprised in the gripping means 11, 12, 13 are so shaped and dimensioned that two or more roll-like support members 21, 22, 23 can be fitted into the disc wheel groove 20 at the lifting stage, so that the support members 21, 22, 23 are positioned in the disc wheel groove 20, and when the lifting movement is still continued, the vehicle wheel 14 rises so that it rests on the gripping means 11, 12, 13, that is, on the support members 21, 22, 23, in practice. By adjusting the lifting means 3 it is thus possible to find a lifting height at which the wheel applies load to the vehicle shaft 24 as little as possible after the fastening bolts of the disc wheel 16 have been removed.

By means of the preferably roll-shaped or ball-shaped support members 21, 22, 23 to be fitted into the disc wheel groove 20 of the disc wheel 16 of the vehicle wheel 14, the vehicle wheel 14 can be rotated easily, which is important for the performance of the work, especially for the alignment of bolt holes 25 in the disc wheel 16. In FIG. 1, the reference numeral 30 indicates ventilation openings in the disc wheel 16.

Figure 5:
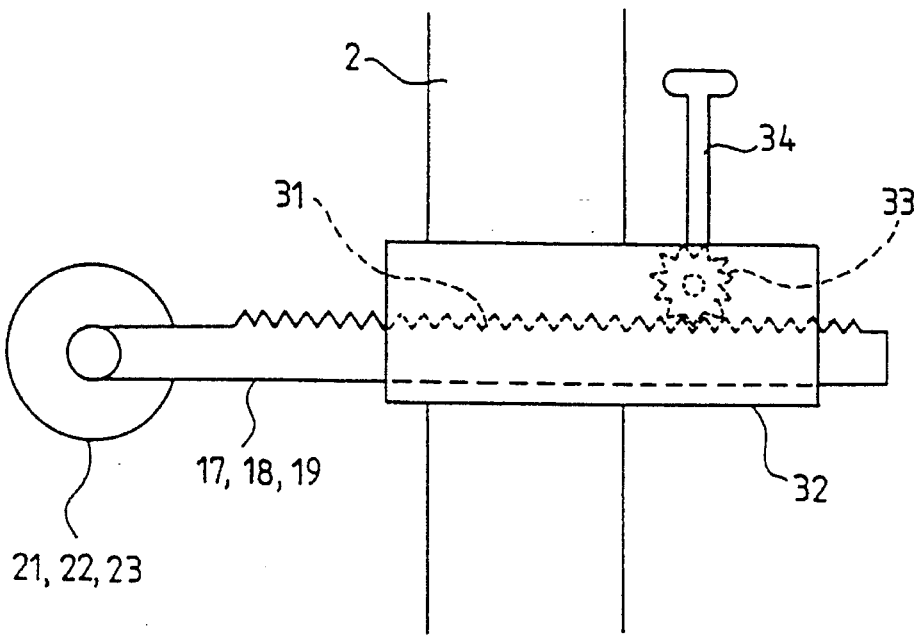
FIG. 5 shows a displacing mechanism for a support member of a gripping means to be fitted into the disc wheel groove of a disc wheel.

FIG. 5 shows the mechanism of the support member 21, 22, 23 of the gripping means 11, 12 or 13 to be fitted into the disc wheel groove, which mechanism enables the roll-like support member 21, 22 or 23 and the support member arm 17, 18, or 19 to be displaced and tightened against the disc wheel groove 20. The mechanism comprises e.g. a gear rack mechanism 31, 32, 33, 34, so that the arm 17, 18, 19 attached to the support member 21, 22 or 23 adjoins a gear rack 31, which can be moved in a housing 32 by means of a gear 33 and a crank handle 34. If required, the disc wheel 16 can be locked from the disc wheel groove 20.

In the preferred embodiment of the invention, as shown in FIGS. 1 and 6, the support members 21, 22, 23 are positioned in the device so that an end face 36 of the vehicle shaft 24 carrying the vehicle wheel 14 to be removed or installed is open in the structure of the device. In this way, it is also possible to handle and rotate twin wheels, as the end of the shaft of the vehicle does not make contact with the device. In FIG. 6, a larger wheel is handled on the left side as compared with the right side. It appears from the figure that it has to be possible to position the support members higher when handling large wheels. In the preferred embodiment of the invention, the support members 21 and 23 above a horizontal center line F of the wheel are connected to the height adjusting means of the support member. The height adjusting means is a slide means 40 for the support member 21 and another slide means 41 for the support member 23. The first slide means 40 can be moved obliquely upward and downward in the direction shown by the arrow A. The second slide means 41 can be moved obliquely upward and downward in the direction of the arrow B. The slide means 40 is shown in FIG. 8, in which the slide means 40 comprises an opening 70 for a shaft means 51 and an opening 71 shown by broken lines G for a locking means 72 shown in FIG. 4. The slide means 41 is of similar construction and opening 70 receives shaft means 53. In addition, the slide means 40 comprises an opening 73 for the upper transverse rod 10 carrying the support members.

The other structural parts shown in FIG. 6 mainly correspond to those shown in FIG. 1; as shown in FIG. 6, the slide means 40 and 41 are attached to the vertically movable frame portion 2 of the frame, which can be lifted by the lifting means 3. In addition, FIG. 6 also shows the preferred embodiment shown in FIGS. 4 and 7, in which at least one support member is connected to a turning means 43 loaded by a spring member 42, so that the support member 22 can be displaced by the action of the movement of the turning means 43 away from the disc wheel groove 20 and returned into the disc wheel groove 20 by the action of the spring force of the spring member. This arrangement also facilitates the handling of larger wheels while it also locks, if required, the wheel in position if the spring force is sufficient. In FIG. 6, arcs C and D show the path of trace of the support member 22, movable by the turning means 43, when the support member 22 is lifted from the disc wheel groove 20 by the turning means 43. The shaft of the turning means is designated by the reference numeral 44.

FIG. 7 is taken in the same direction as FIGS. 2 and 4. Bolt holes 25 extend through a disc-wheel end 54 shown in the middle of FIG. 7. In one preferred embodiment of the invention, as shown in FIG. 7, one or more support members 22 to be fitted into the disc wheel groove 20 are connected to a support member collar portion 45, the edge of the disc wheel groove 20 being arranged to be fitted between the support member 22 and the collar portion 45. In the preferred embodiment of the invention, the spring-loaded support member 22 is the support member which is connected to the collar portion 45. As shown in FIGS. 3, 4 and 7, the support members 21 and 23 are attached by means of shafts 51 and 53 to the vertically movable frame portion 2 or to the upper transverse pipe 10 interconnecting the halves of the frame portion 2. In the preferred embodiment of the invention, to facilitate the rotation of the wheel and the alignment of bolt holes, at least one support member 21, 23, is connected to a handle means 61, 63, positioned on the shaft 51, 53 of the support member, respectively, the support member 21, 23 being rotatable by the handle means 61, 63, as shown in FIG. 7 (also FIGS. 3 and 4). FIG. 7 also shows the slide means 40 with the opening 73, through which the upper transverse pipe 10 extends.

In the preferred embodiment of the invention, the two support members 21, 23 are fitted into the disc wheel groove 20 above a horizontal center line F of the wheel on opposite sides of a vertical centre line E of the wheel, and support member 22 is fitted into the disc wheel groove 20 below the horizontal center line F, as shown in FIG. 6. This arrangement enables the wheel to be rotated easily and ensures that the wheel stays in place in the device.

FIG. 3 is a top view of the device. The figure shows the outer, vertically movable frame portion 2, which comprises the two pipes and an interconnecting transverse pipe 10 as in FIG. 1. The gripping means 11 and 13, that is, the support member 21 and the shaft 51 and the support member 23 and the shaft 53, are attached to the upper transverse pipe 10. The outer, vertically movable frame portion 2 can be lifted with respect to the stationary inner frame portion 1 by the lifting means 3 via the lower interconnecting rod 5a (FIG. 1), which, however, is not shown in FIG. 3, as it remains below the upper transverse pipe 10. The shafts 51 and 53 pass through pipes 81 and 83. The shaft 51, for example, is mounted with respect to the pipe 81 by a bearing 91. The pipes 81 and 83 are attached to the upper transverse pipe 10 of the vertically movable frame portion 2; in the preferred embodiment of the invention, the support members 21 and 23 are thus attached rotatably to the pipes 81 and 83 by means of the shafts 51 and 53, and therefore the wheel can be rotated accurately by means of the handle means 61 and 63 connected to the shafts 51 and 53. In other words, the pipes 81 and 83 act as fastening means for the support members 21 and 23. The fastening means, that is, the pipes 81 and 83, can be attached directly to the frame portion 2 or the attachment can be made indirectly by attaching the pipes 81 and 82 to the upper transverse pipe 10 interconnecting the different halves of the frame portion 2, as shown in FIGS. 3, 4 and 7.

The drawings and the related description them are only intended to illustrate the concept of the invention. In its details, the device according to the invention may vary considerably within the inventive concept defined in the claims. The device according to the invention is suitable for handling vehicle wheels. In addition to a lorry, the device according to the invention can be used for handling wheels of tractors form implements, airplanes, cars or vans, for instance.

I claim:

1. A device for handling a wheel of a vehicle for selectively installing or removing the wheel relative to a shaft of the vehicle, said device comprising:

a vertically movable frame, gripping means connected to said frame for movement therewith for engaging a wheel of a vehicle to displace the wheel relative to the shaft of the vehicle during removal and installation of the wheel, said wheel having a disc with a groove into which said gripping means is engageable, said gripping means being shaped and arranged to engage said wheel and permit rotation of the wheel on the gripping means, said gripping means comprising three support members, said wheel having vertical and horizontal center lines, two of said support members being engageable in the groove of said disc of the wheel above said horizontal center line on opposite sides of said vertical center line, the third support member being engageable in the groove of said disc of the wheel below the horizontal center line, at least one of said support members including a shaft rotatably supported by said frame and handle means on the latter said shaft for rotating said at least one of said support members.

2. A device as claimed in claim 1, comprising means for displacing said two support members relative to said frame to adjust the vertical position of said two support members.

3. A device as claimed in claim 1, wherein said frame is shaped to freely accommodate an end face of said shaft.

4. A device as claimed in claim 1, comprising means for displacing at least one of said support members relative to the groove in said disc to selectively tighten or loosen said one support member in said groove.

5. A device as claimed in claim 1, comprising turning means for turning at least one of said support members to selectively lift or lower the latter said one support member out of or into said groove in said disc, and spring means acting on said turning means to urge said latter said one support member into said groove.

6. A device as claimed in claim 5, wherein said at least one of said support members which is turned by said turning means includes a shaped member rollably engageable in the groove of the disc of the wheel, and a collar connected to said shaped member, said disc having a free end engaged between the shaped member and said collar.

7. A device as claimed in claim 1, wherein said frame is of inverted U-shape and surrounds said wheel.

8. A device as claimed in claim 1, wherein said support members each includes a shaped member rollably engaged in the groove of the wheel disc.

9. A device as claimed in claim 1, comprising means including a slide supported by said frame and supporting a respective one of said support members for adjustable positioning thereof relative to said frame.

10. A device as claimed in claim 9, wherein said slide is inclined relative to said horizontal and vertical center lines.

11. A device as claimed in claim 1, comprising jack means for lifting and lowering said frame.

12. A device as claimed in claim 1, comprising means for longitudinally displacing at least one of said support members towards and away from said groove.

13. A device as claimed in claim 1, wherein said at least one support member is above said horizontal center line.

14. A device as claimed in claim 1, wherein said at least one support member is above said horizontal center line, said third support member below the horizontal center line including turning means for lifting said third support member out of said groove in the disc of the wheel, and spring means acting on said turning means for urging said third support member tightly into said groove in the disc of the wheel.

15. A device as claimed in claim 1, wherein said support members are positioned and attached to the vertically movable frame such that an end face of the shaft for the wheel is open in the device.

* * * * *